(No Model.)
E. STORM.
FIFTH WHEEL.
No. 344,756. Patented June 29, 1886.
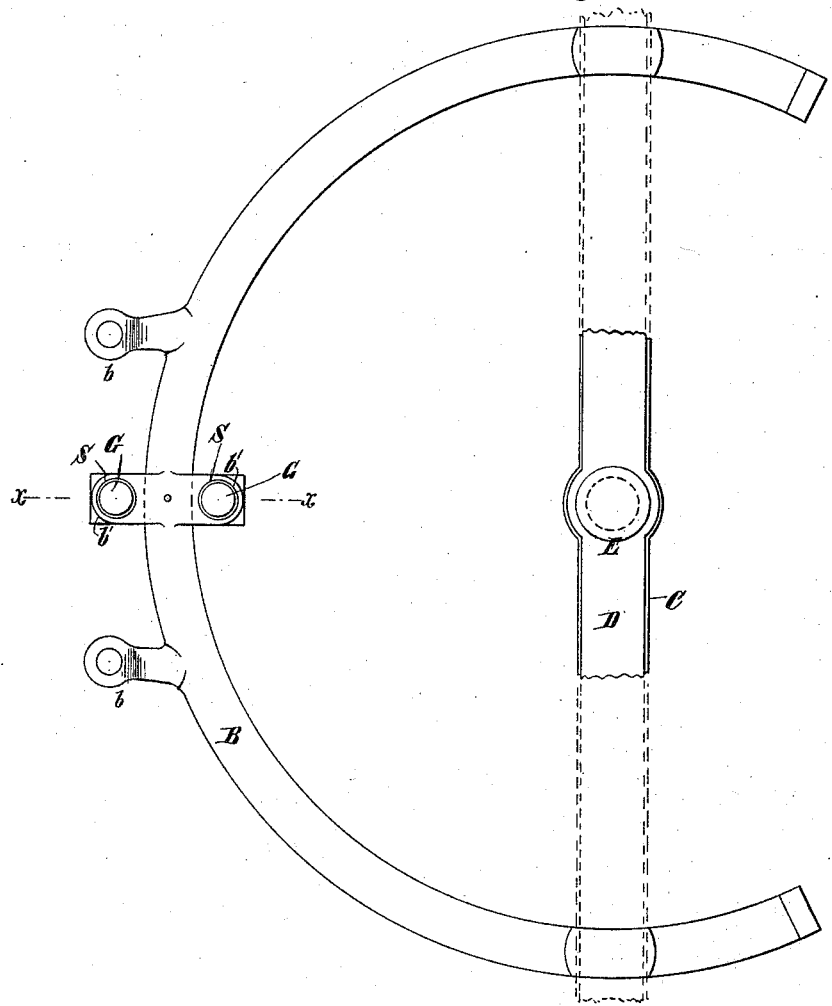
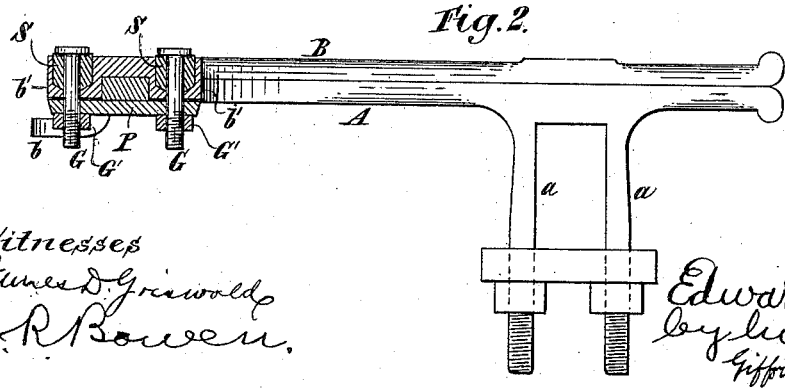
Witnesses
James D. Griswold
J. R. Bowen
Inventor
Edward Storm
by his attorneys
Gifford & Brown

UNITED STATES PATENT OFFICE.

EDWARD STORM, OF POUGHKEEPSIE, NEW YORK.

FIFTH-WHEEL.

SPECIFICATION forming part of Letters Patent No. 344,756, dated June 29, 1886.

Application filed October 19, 1885. Serial No. 180,240. (No model.)

*To all whom it may concern:*

Be it known that I, EDWARD STORM, of Poughkeepsie, in the county of Dutchess and State of New York, have invented a certain new and useful Improvement in Fifth-Wheels for Wheeled Vehicles, of which the following is a specification.

I will describe in detail a fifth-wheel embodying my improvement, and then point out the novel features in a claim.

Figure 1 is a plan view of a fifth-wheel, and Fig. 2 is a section of same on line *x x*.

A B designate two parts, of circular form, constituting the fifth-wheel. They are flat upon their meeting faces, and are imperforate.

The lower part, A, has clips *a*, whereby it can be secured to the front axle, C. The upper part is to be secured to a bolster or bed, D. This upper part is also secured to a reach. As shown, it is adapted to be secured to a double reach, lugs *b* being arranged upon it for that purpose. It may, however, be formed so as to adapt it for attachment to a single reach. The bolster or bed D is secured to the axle C by a king-bolt, E.

The upper circular part, B, is provided with lugs *b'*, extending downwardly on both sides of the lower circular part, A, so as to embrace it and form guides. These downwardly-extending lugs *b'* extend close to a plate, P, that is arranged below the lower circular part, A, and the lugs *b'*. Screws G pass through the lugs *b'* and plate P, and secure them together. The screws consequently secure the two circular parts together, and without passing through the circular parts themselves. Either circular part may move circularly with relation to the other, the outside guides, consisting of the lugs *b'*, permitting of this.

The screws G at one end act in conjunction with springs S, so that the two circular parts A B are held together with a yielding pressure. These springs are shown as consisting of blocks of india-rubber, fitting in cavities in the lugs *b'* and having holes in the center, through which the screws G pass. The heads of these screws bear upon the springs, and are of such size relatively to the cavities in which the springs fit that they may enter the cavities. Nuts G', applied to the lower ends of the screws G, secure the screws in place. They may be adjusted to cause the screw-heads to act with more or less pressure on the springs, and thus to secure the two circular parts together with more or less pressure.

By my improvement I am enabled to secure the two parts of a fifth-wheel together with a yielding pressure, and without screws passing through arc-shaped slots. It is very advantageous to dispense with the slots, because they are apt to become filled with dirt from the splashings of the animals drawing the vehicles, and when filled with dirt their working is liable to soon become impaired.

What I claim as my invention, and desire to secure by Letters Patent, is—

In a fifth-wheel, the combination of two circular parts fitted together one upon the other, guides made integral with one and extending therefrom and embracing the other transversely to its length, screws or like devices passing through the guides to secure the two circular parts together, springs arranged within recesses in the guides, against which these securing devices act at one end, and a loose plate below the guides, supported by the securing devices, substantially as specified.

EDWARD STORM.

Witnesses:
HENRY E. LOSEY,
CHARLES B. HERRICK.